A. AMSLER.
SPRING WHEEL.
APPLICATION FILED NOV. 29, 1918.
1,295,082.
Patented Feb. 18, 1919.
2 SHEETS—SHEET 1.
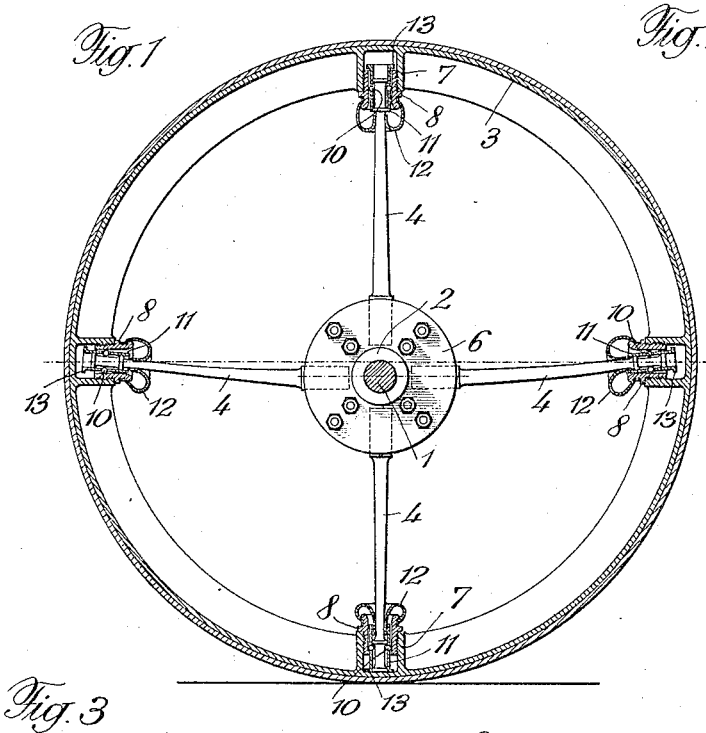
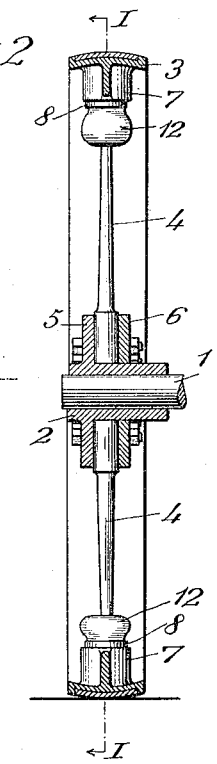
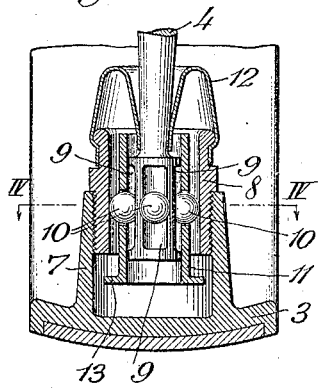
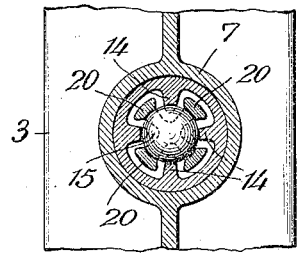
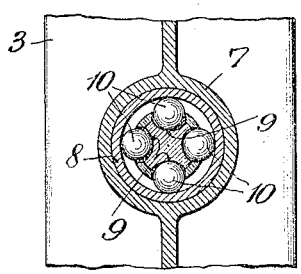
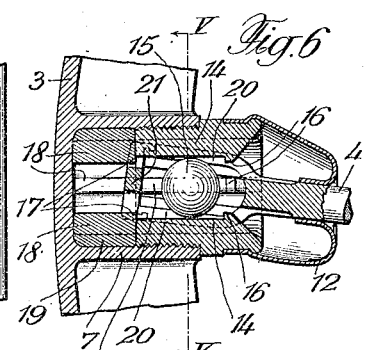
Inventor:
Alfred Amsler,
By Henry Orth
Atty.

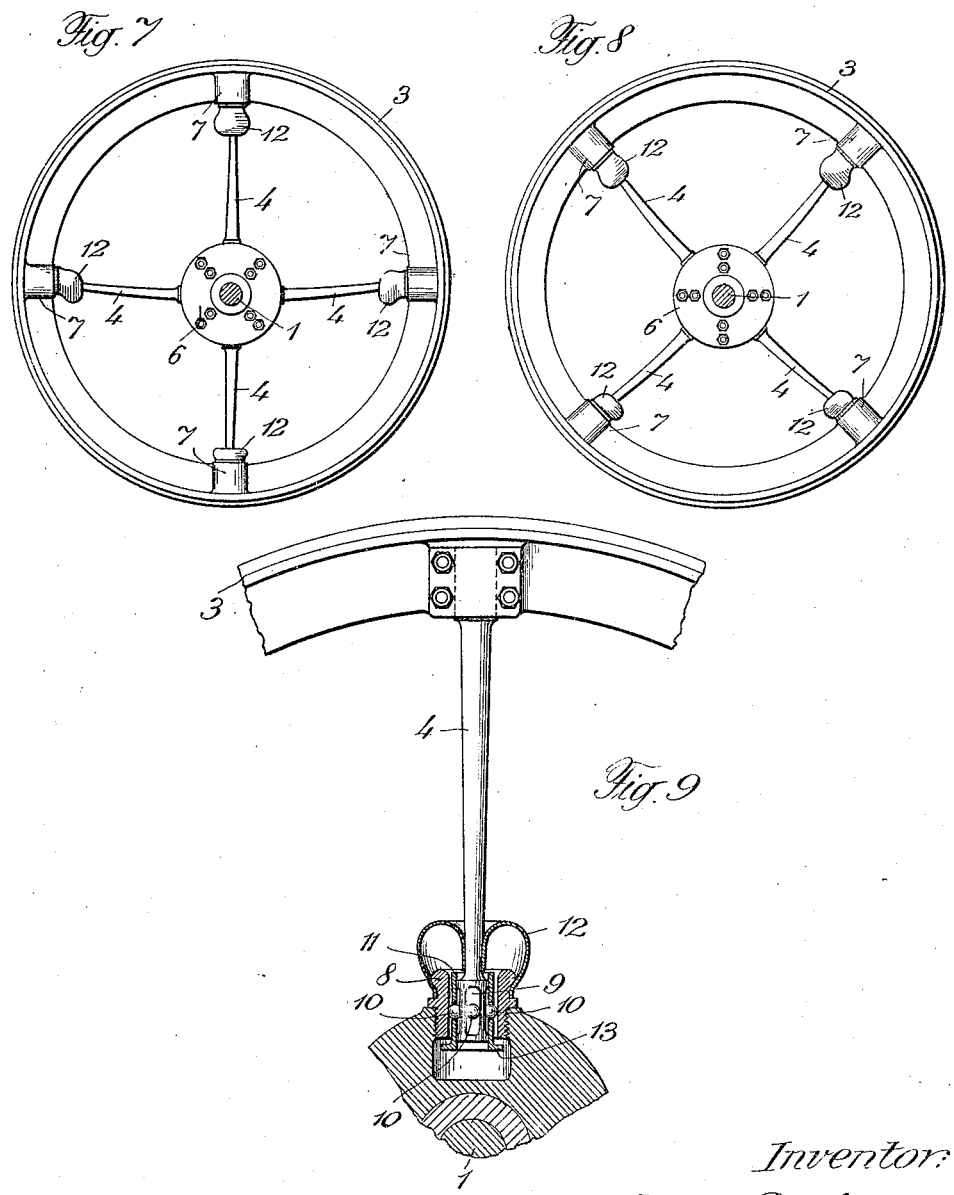

UNITED STATES PATENT OFFICE.

ALFRED AMSLER, OF RHEINBÜHL, SCHAFFHAUSEN, SWITZERLAND.

SPRING-WHEEL.

1,295,082.  Specification of Letters Patent.  Patented Feb. 18, 1919.

Application filed November 29, 1918. Serial No. 264,590.

*To all whom it may concern:*

Be it known that I, ALFRED AMSLER, a citizen of the Republic of Switzerland, residing at Rheinbühl, Schaffhausen, Switzerland, have invented certain new and useful Improvements in Spring-Wheels; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention relates to spring wheels having spokes rigidly connected at one end to the hub or wheel rim respectively, while their other movable end is guided in a snug manner in the wheel rim or hub respectively.

The object of the invention is to provide a spring wheel the construction of which enables the spokes to bend yieldingly in all directions and which provides for such a guiding of the free end of the spokes that they are adapted to incline in all directions toward the wheel rim or hub respectively, so that the spokes alone are adapted to absorb shocks transmitted in the plane of the wheel as well as such directed transversally to said plane.

With the above and other objects in view, the invention consists in the construction, combination and arrangement of parts, as will hereinafter be more fully described, illustrated and claimed.

In the accompanying drawings in which similar parts are designated by corresponding numerals:

Figure 1 is partly a side view and partly a cross-section taken on the line I—I of Fig. 2 of a wheel according to this invention.

Fig. 2 is a transverse vertical section thereof showing some parts in front view;

Fig. 3 is an enlarged longitudinal section through a detail and

Fig. 4 a cross-section on the line IV—IV of Fig. 3.

Figs. 5 and 6 show a detail of a second embodiment of the invention, Fig. 5 being a section on the line V—V of Fig. 6.

Figs. 7 and 8 show diagrammatically the manner of the operation of the improved wheel illustrated in Figs. 1—4 and shown in these two figures in two different positions.

Fig. 9 shows a part of a further construction of a wheel to which the present invention is applied.

Referring to the drawings, 1 designates the axle on which is mounted the hub 2 of a wheel. 3 is the rigid wheel rim or felly of the wheel and 4 are the spokes of the wheel equally spaced about the hub 2. The spokes 4 are straight and they are adapted to bend yieldingly in the direction of the plane of the wheel as well as transversely thereto. They extend between a flange 5 of the hub and an annular plate 6 radially from the hub 2 to which they are rigidly connected; they can be thus considered as girders fixed at one end to the hub.

In the embodiment of the invention shown in Figs. 1–4, the outer ends of the spokes 4 extend into radially arranged casings 7 of the felly 3. Into each casing 7 is screwed a cylindrical sleeve 8. The outer end of each spoke which is not fixed to any part of the wheel, is of cylindrical shape and has grooves or recesses 9 extending in its axial direction. Into each groove 9 is put a round body which in the embodiment shown has the shape of a ball 10. The balls 10 are in snug contact with the inner wall of the sleeve 8 and they are provided for guiding the spokes 4 on the sleeve 8. 11 designates a tubular member provided with apertures taking up the balls 10, so that it forms a cage for the balls 10. The described design provides for a snug guiding of the movable end of the spokes. 12 is cap of flexible material, such as leather, rubber or the like. This cap 12 is for closing the ball race or bearing in a tight manner toward the outside.

13 designates a flange provided on the tubular member 11. Said flange 13 admits only a limited displacement of the member 11, thus preventing the balls 10 from coming out of contact with the inner wall of the sleeve 8.

In the embodiment of the invention shown in Figs. 1–4, the wheel comprises four spokes 4 distributed equally over the circumference of the wheel. When the wheel assumes the position shown in Fig. 7, the load acting on the axle 1 causes a bending of the two horizontal spokes 4, their free ends being displaced within the sleeves 8 and being caused at the same time to incline therein. In this position of the wheel the two vertical spokes 4 are not bent; they are only displaced within the sleeves 8, helping thereby to prevent the hub 2 to give way in a horizontal direction relatively to the felly 3. When the wheel assumes for instance the position shown in Fig. 8, all four spokes are bent, the magnitude of the bending or sagging of each pair of spokes being proportional to the load- or pressure-component acting at right angles to the direction of the pair of spokes upon the latter. The resultant of the saggings of the two pairs of spokes is consequently proportional to the total load transmitted by the hub to the wheel and it has the same direction as the direction in which said total load acts. From this follows, that the hub is depressed or caused to sink always to the same amount when the hub load remains the same, whatever the momentary position of the wheel relatively to the road may be.

Any suitable shape may be given to the cross-section of the spokes 4, provided that it is such to enable the spokes to take up shocks occurring in the plane of the wheel as well as such acting transversely to said plane. In order that the spokes can sag as much as possible and to increase consequently the spring-action of the wheel, the cross-sectional area of the spokes 4 must decrease toward the wheel rim, as is the case in the embodiment shown in Figs. 1–4. The ratio of the bending moment referred to the point of support of the guided end of the spokes to the moment of resistance to any cross-section must be a constant one over the whole length of the spokes. When this is the case, the spokes bend after an arc of a circle and the maximum stress to which the material of the spoke is subjected is the same in all cross-sections.

In the second embodiment of the invention illustrated in Figs. 5 and 6, the sleeve 8 has four ribs 14 extending in its axial direction. 15 denotes a ball adapted to roll between the ribs 14. The amount to which the ball 15 is able to move relatively to the ribs 14 is limited at one end of the sleeve 8 by projections 16 and at the other end by the edges 17 of ribs 18 of a distance-ring 19. The end of each spoke 4 terminates in four arms 20 surrounding ball 15. It will be seen, that in this second embodiment a single ball effects the guiding of the end of the spoke on the felly of the wheel and that the movable end of the spoke is also guided in a snug and adjustable manner.

In the embodiments shown, the improved wheel is provided with four spokes; the number of spokes can also be, however, a multiple of four, the manner of operation of the spring wheel being not altered in any way in such a case, provided that the four spokes belonging together are always arranged at right angles with regard to one another. When the number of spokes is great, they can be made thinner, so that their sagging is consequently greater, while the stress to which the material is subjected remains the same.

The described constructions of the wheel admit a bending of the spokes not only in the plane of the wheel, but also out of said plane, so that lateral shocks transmitted to the wheel are also taken up by the spokes alone.

In the embodiment shown in Fig. 9, the spokes are rigidly connected at one end to the felly, while their other end is adjustably guided on the hub. The guiding of the free end of the spokes in the hub is effected in just the same manner as it has been described with regard to the free end adapted to move on the felly. In this embodiment the cross-sectional area of the spokes 4 decreases gradually from the outer to the inner extremities thereof.

What I claim now as my invention is:

1. A wheel of the character specified, comprising a hub, a felly, a plurality of spokes arranged radially about the hub and rigidly connected at one end to one of said wheel parts, and means carried by the other one of said first mentioned two wheel parts and acting as guides for the free end of the spokes so that the latter are enabled to bend resiliently in all directions and to incline in all directions relatively to the wheel part carrying said means, the spokes being thus adapted to take up shocks occurring in the plane of the wheel as well as such directed crosswise thereto.

2. A wheel of the character specified, comprising a hub, a felly, a plurality of spokes arranged radially about the hub and rigidly connected at one end to one of said wheel parts, guiding means carried by the other one of said first mentioned two wheel parts, and rolling members coöperating with the free ends of the spokes and said guiding means, the free ends of the spokes being guided in a snug manner on said means, so that the spokes are enabled to bend resiliently in all directions and to incline in all directions relatively to the wheel part carrying said guiding means.

3. A wheel of the character specified, comprising a hub, a felly, a plurality of spokes arranged radially about the hub and rigidly connected at one end to one of said wheel parts, a sleeve in connection with each spoke, and fixed to the other one of said first mentioned parts of the wheel and being arranged radially thereto, balls inserted into grooves of the free end of the spokes, and a member mounted within each of said sleeves adapted to move relatively to the latter and acting as a support for the balls inserted into the grooves of the spokes, said balls being in snug contact with the inner wall of the sleeve.

4. A wheel of the character specified, comprising a hub, a felly, a plurality of spokes arranged radially about the hub and rigidly connected at one end to one of said wheel parts, a sleeve in connection with each spoke, and fixed to the other one of said first mentioned parts of the wheel and being arranged radially thereto, balls inserted into grooves provided in the free end of the spokes, a member mounted within each of said sleeves and adapted to move relatively thereto and acting as a support for the balls inserted into the grooves of the spokes, said balls being in snug contact with the inner walls of the sleeves, and means for limiting the relative movement between the sleeves and the members mounted within them.

5. A wheel of the character specified, comprising a hub, a felly, a plurality of spokes arranged radially about the hub and rigidly connected at one end to one of said wheel parts, the free end of the spokes having a cylindrical shape, a sleeve in connection with each spoke, and fixed to the other one of said first mentioned parts of the wheel and being arranged radially thereto, cages mounted on the cylindrical ends of the spokes and adapted to slide in the longitudinal direction of said ends and provided with apertures, balls inserted into grooves provided in the free end of the spokes, said cages acting as supports for the balls in snug contact with the inner wall of the sleeves and each of them being provided with a flange adapted to coöperate with the sleeve surrounding said cage for the purpose of limiting the relative movement between the cage and the sleeve.

In testimony that I claim the foregoing as my invention, I have signed my name.

ALFRED AMSLER.

Copies of this patent may be obtained for five cents each, by addressing the "Commissioner of Patents, Washington, D. C."